(12) United States Patent
Klusacek

(10) Patent No.: US 10,184,355 B2
(45) Date of Patent: Jan. 22, 2019

(54) SUPERCHARGING DEVICE

(71) Applicant: Bosch Mahle Turbo Systems GmbH & Co. KG, Stuttgart (DE)

(72) Inventor: Michal Klusacek, Prague (CZ)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 0 days.

(21) Appl. No.: 15/586,256

(22) Filed: May 3, 2017

(65) Prior Publication Data
US 2017/0321571 A1    Nov. 9, 2017

(30) Foreign Application Priority Data

May 4, 2016    (DE) .................. 10 2016 207 698

(51) Int. Cl.

| F16C 27/06 | (2006.01) |
|---|---|
| F16C 23/04 | (2006.01) |
| F01D 25/16 | (2006.01) |
| F16C 35/07 | (2006.01) |
| F16C 13/06 | (2006.01) |
| F04D 29/046 | (2006.01) |

(52) U.S. Cl.
CPC ......... F01D 25/164 (2013.01); F01D 25/168 (2013.01); F16C 13/06 (2013.01); F16C 23/048 (2013.01); F16C 27/06 (2013.01); F16C 35/07 (2013.01); *F04D 29/046* (2013.01); *F05D 2220/40* (2013.01); *F05D 2240/52* (2013.01); *F16C 2360/24* (2013.01)

(58) Field of Classification Search
CPC ........ F16C 13/06; F16C 27/06; F16C 23/048; F16C 1360/24; F16C 2360/24; F16C 35/07; F05D 2220/40; F05D 2240/20; F05D 2240/50; F04D 2240/52; F04D 29/046; F04D 29/266; F01D 25/164; F01D 25/166; F01D 25/168
USPC ....... 384/129, 142, 223, 249, 251, 253, 258, 384/261, 264; 417/407; 415/170.1
See application file for complete search history.

(56) References Cited

U.S. PATENT DOCUMENTS

| 4,256,353 A | 3/1981 | Fischer et al. |
|---|---|---|
| 4,648,790 A * | 3/1987 | Horler ............ F01D 5/00 415/112 |

(Continued)

FOREIGN PATENT DOCUMENTS

| DE | 69317530 T2 | 9/1998 | |
|---|---|---|---|
| DE | 102008052189 A1 * | 6/2010 | ........... G01L 5/0019 |

(Continued)

*Primary Examiner* — Marcus Charles
(74) *Attorney, Agent, or Firm* — Fishman Stewart PLLC

(57) ABSTRACT

A supercharging device includes a rotor mounted in a housing via an axial bearing disposed on an end side of the rotor. The axial bearing includes an axial bearing disc with a first bearing surface, a membrane with a central first opening, and a screw connection that secures the axial bearing disc to the membrane through the central first opening. The axial bearing further includes a bush with a central second opening, wherein the bush is connected to the housing and the membrane is clamped in between the bush and the housing, and an adjusting screw screwed into the central second opening of the bush, wherein the adjusting screw delimits and facilitates an axial movement of the screw connection and thus of the axial bearing disc.

20 Claims, 9 Drawing Sheets

(56) References Cited

U.S. PATENT DOCUMENTS

| | | | | |
|---|---|---|---|---|
| 4,784,586 A | * | 11/1988 | Ho | ............ F01D 21/00 |
| | | | | 415/114 |
| 4,808,069 A | * | 2/1989 | Bonner | ................ F01D 17/162 |
| | | | | 384/435 |
| 5,397,185 A | | 3/1995 | Meuwese et al. | |
| 6,499,884 B1 | * | 12/2002 | Svihla | ................... F01D 25/162 |
| | | | | 384/138 |
| 7,131,332 B2 | * | 11/2006 | Langer | ................ G01M 13/028 |
| | | | | 73/593 |
| 8,845,279 B2 | * | 9/2014 | Hoecker | ............... F01D 17/165 |
| | | | | 415/164 |
| 2015/0285260 A1 | * | 10/2015 | Klusacek | ................ F02B 33/40 |
| | | | | 416/174 |
| 2016/0040545 A1 | | 2/2016 | Klusacek | |

FOREIGN PATENT DOCUMENTS

| | | | | |
|---|---|---|---|---|
| DE | 102008060370 A1 | * | 6/2010 | ............ F01D 25/16 |
| DE | 102013213023 A1 | * | 1/2015 | ............ F01D 5/025 |
| DE | 102014215441 A1 | | 2/2016 | |
| FR | 1247692 A | | 12/1960 | |
| GB | 911112 A | | 11/1962 | |
| JP | 2013221471 A | * | 10/2013 | ............ F02B 37/10 |
| JP | 2014156859 A | * | 8/2014 | ........... F01D 25/168 |

* cited by examiner

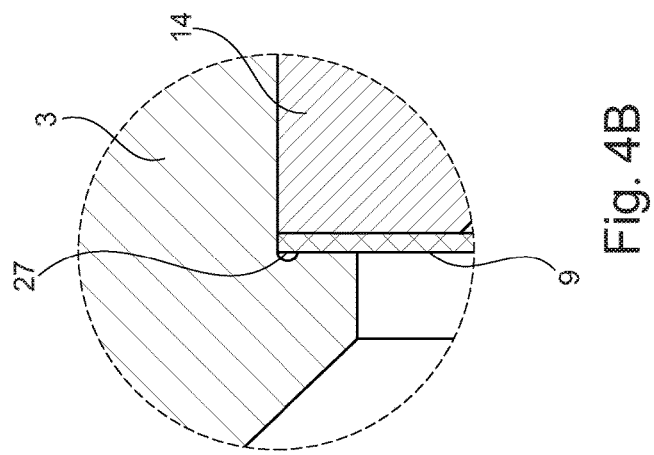
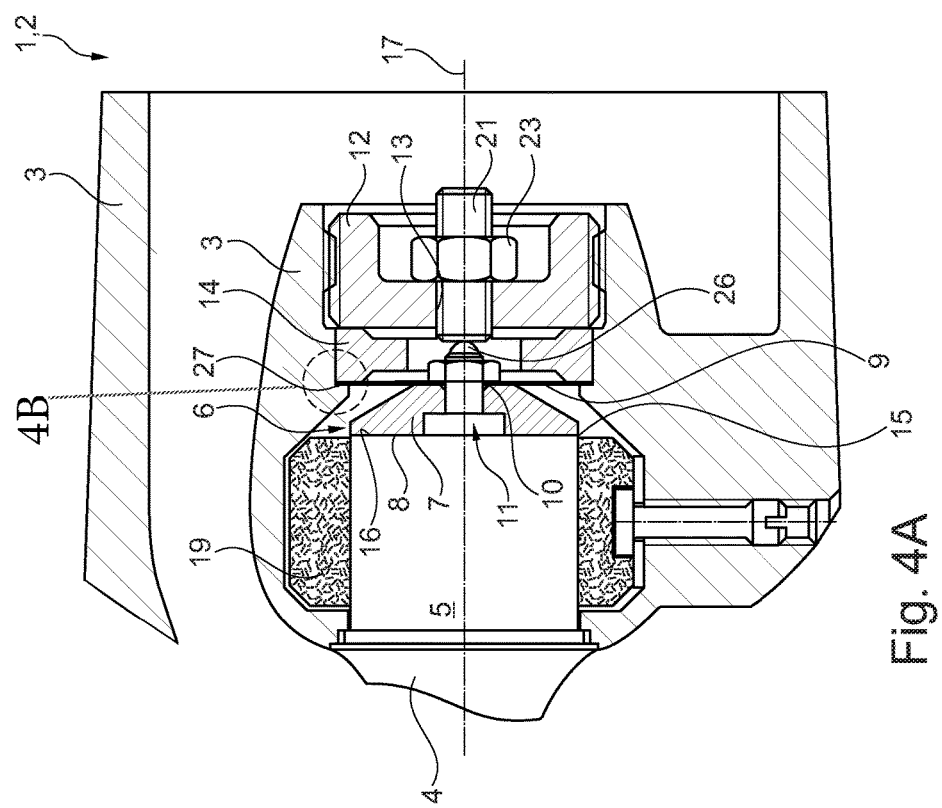

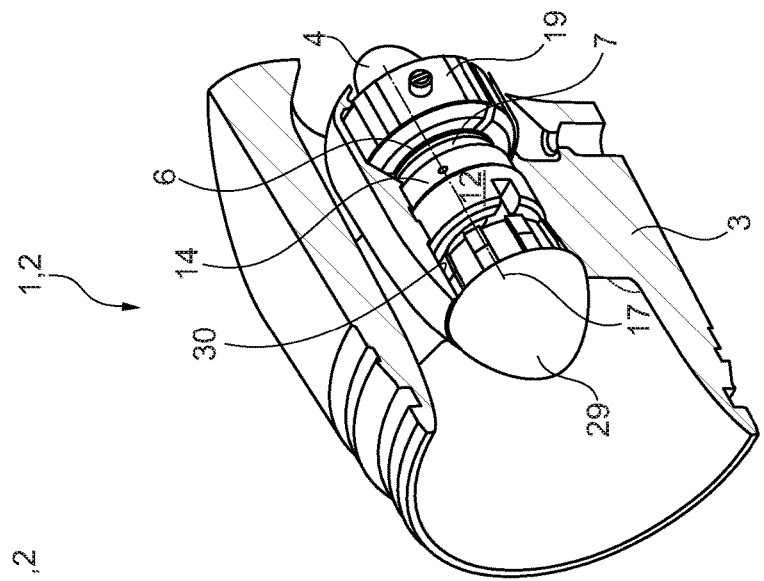
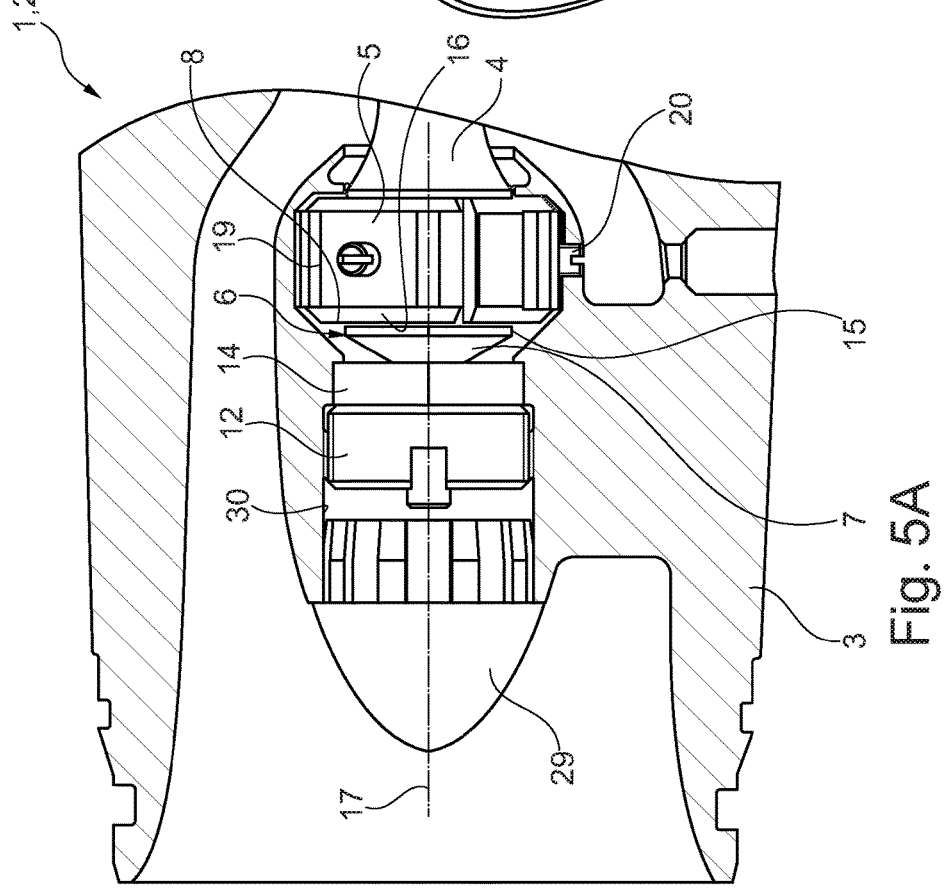

SUPERCHARGING DEVICE

CROSS-REFERENCE TO RELATED APPLICATION

This application claims priority to German Patent Application No. 10 2016 207 698.1, filed on May 4, 2016, the contents of which are hereby incorporated by reference in its entirety.

TECHNICAL FIELD

The present invention relates to a supercharging device with a rotor mounted in a housing.

BACKGROUND

From U.S. Pat. No. 4,256,353 A, a generic supercharging device with a rotor mounted in a housing is known.

In the case of stationary gas turbines, rotors are known which are gassed dynamically, gas-statically mounted. The basis of this mounting however is that a stator part is connected to a bearing housing in a fixed manner. Here it is important that both parts, namely the previously mentioned stator part and a rotor are aligned as parallel as possible with respect to one another since even a comparatively slightly tilting or deviating of the two axes can lead to a deterioration or even a complete loss of the load carrying capacity of a bearing. In the case of stationary gas turbines, this is prevented for example in that a stator design is formed extremely solidly, but thereby also expensively. Likewise, an axial bearing cannot move in axial direction either and thereby offset any temperature strain.

However, disadvantageous with the bearings for large gas turbines known from the prior art is that their solid embodiment of the stator cannot be transferred, owing to the weight but also because of an uneven temperature strain, to supercharging devices in a motor vehicle, for example exhaust gas turbochargers.

The present invention therefore deals with the problem of stating an improved or at least an alternative embodiment for a supercharging device of the generic type which in particular makes an improved mounting of a rotor in a supercharging device or other fast-rotating rotors.

According to the invention, this problem is solved through the subject of the independent Claim(s). Advantageous embodiments are subject of the dependent claims.

SUMMARY

The present invention is based on the general idea of mounting a rotor of a supercharging device mounted at an end side, but generally also of another unit of a fast-rotating rotor, for the first time via an axial bearing that is fixed in axial direction but comparatively insensitive with respect to a tilting of the rotor. Here, the rotor is mounted in a housing of the supercharging device via an axial bearing on the end side, wherein this axial bearing according to the invention comprises the present components: an axial bearing disc (with or without grooves) with a first bearing surface, a membrane with a central first opening, a screw connection, via which the axial bearing disc is screwed through the second opening to the membrane, a bush with a central second opening (with thread), wherein the bush is connected, in particular screwed to the housing, and the membrane is clamped in between the bush and the housing, and an adjusting screw, which is screwed into the central second opening of the bush and delimits an axial movement of the screw connection and thus also of the axial bearing disc and simultaneously makes possible adjusting. By way of the membrane provided according to the invention it is thus possible for the axial bearing disc to offset any angular deviations between a desired axis of rotation of the rotor and an existing axis of rotation or an "out-of-squareness error" of the rotor, since the axial bearing disc can tilt via the comparatively soft membrane. An axial movement of the axial bearing disc by contrast is prevented or made possible by the adjusting screw depending on position. With an axial bearing provided according to the invention in such a manner, an irregular heating that occurs during the operation of the supercharging device and which for example can constitute a reason for a deformation of the housing, can be comparatively easily compensated since the axial bearing disc, i.e. in the present case the stator of the axial bearing, is no longer connected to the housing in a fixed manner but merely flexibly via the membrane according to the invention. In addition, this membrane is able to offset inaccuracies during the assembly of the supercharging device and the production. By way of the adjusting screw it is additionally possible to adjust a position of the axial bearing disc in axial direction. Accordingly, one can at least slightly shift the rotor in axial direction and thereby adjust an optimal distance between compressor blades and compressor housing and/or for example also tension the membrane. By means of the axial bearing according to the invention it is thus possible to mount a rotor mounted on the end side extremely precisely and free of maintenance in the housing, since the axial bearing disc which via the membrane is flexibly connected to the housing, can adjust itself to temperature-related deformations in the rotor or in the housing.

In an advantageous further development of the solution according to the invention, the axial bearing disc has a truncated cone-like shape and is arranged with its first bearing surface spaced via a gap from a second bearing surface of the rotor located opposite. Here, grooves can either be arranged on the first bearing surface of the axial bearing disc and/or on the second bearing surface of the rotor. The truncated cone-like shape in this case makes possible a large first bearing surface for the face-end axial mounting of the rotor and a merely small contact surface on the membrane, which makes possible tilting of the axial bearing disc through a corresponding deformation of the membrane. The screw connection centrally penetrates the truncated cone-like axial bearing disc and because of this is comparatively easy to assemble.

In a further advantageous embodiment of the solution according to the invention, the screw connection comprises a washer. By way of such a washer, an undesirable loosening of the screw connection can be reliably avoided.

Practically, the membrane comprises at least one through-opening. With at least one such through-opening it is thus possible to comparatively easily adjust the membrane with respect to its stiffness sense by providing for example a plurality of through-openings the stiffness of the membrane decreases. Obviously, the stiffness of the membrane can be alternatively or additionally adjusted also via its thickness.

In a further advantageous embodiment of the solution according to the invention the membrane is clamped in between the bush and the housing over its entire circumference or only in at least three locations. By way of this it is also possible to easily adjust an individual behaviour of the membrane, for example also the stiffness of the same.

Further important features and advantages of the invention are obtained from the subclaims, from the drawings and from the associated figure description by way the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

There it shows, in each case schematically,

FIG. 4A illustrates a representation as in FIG. 3A according to an example, FIG. 4B illustrates a detail 4B of the representation of FIG. 4A, FIG. 5A illustrates a further embodiment with a cup for the aerodynamically favourable covering of the axial bearing, FIG. 5B illustrates an oblique view of the sectional representation according to FIG. 5A.

DETAILED DESCRIPTION

Figure 1A:
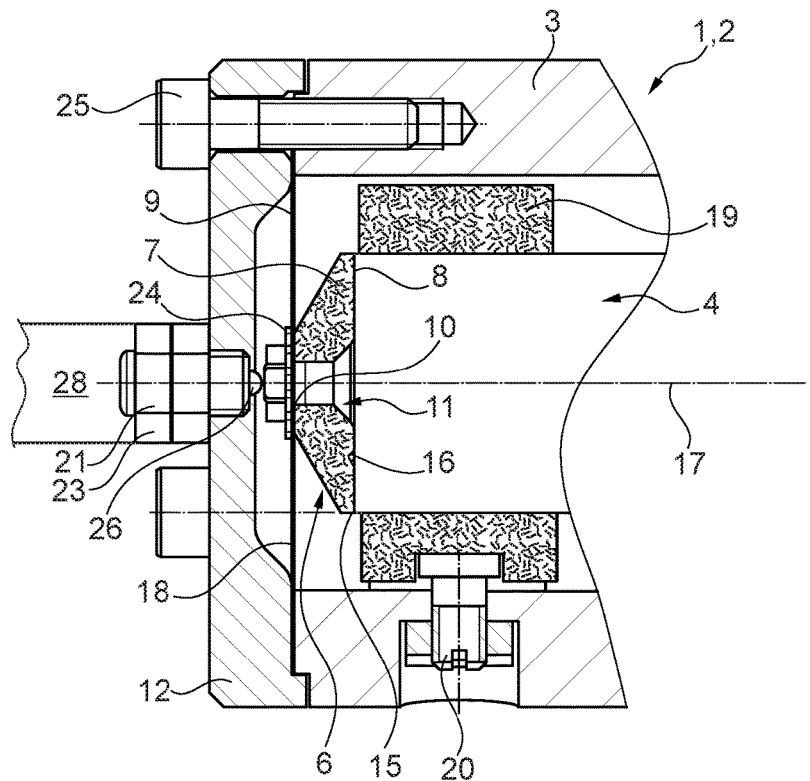
FIG. 1A illustrates a sectional representation through a supercharging device according to the invention in the region of an axial bearing.
Figure 1B:
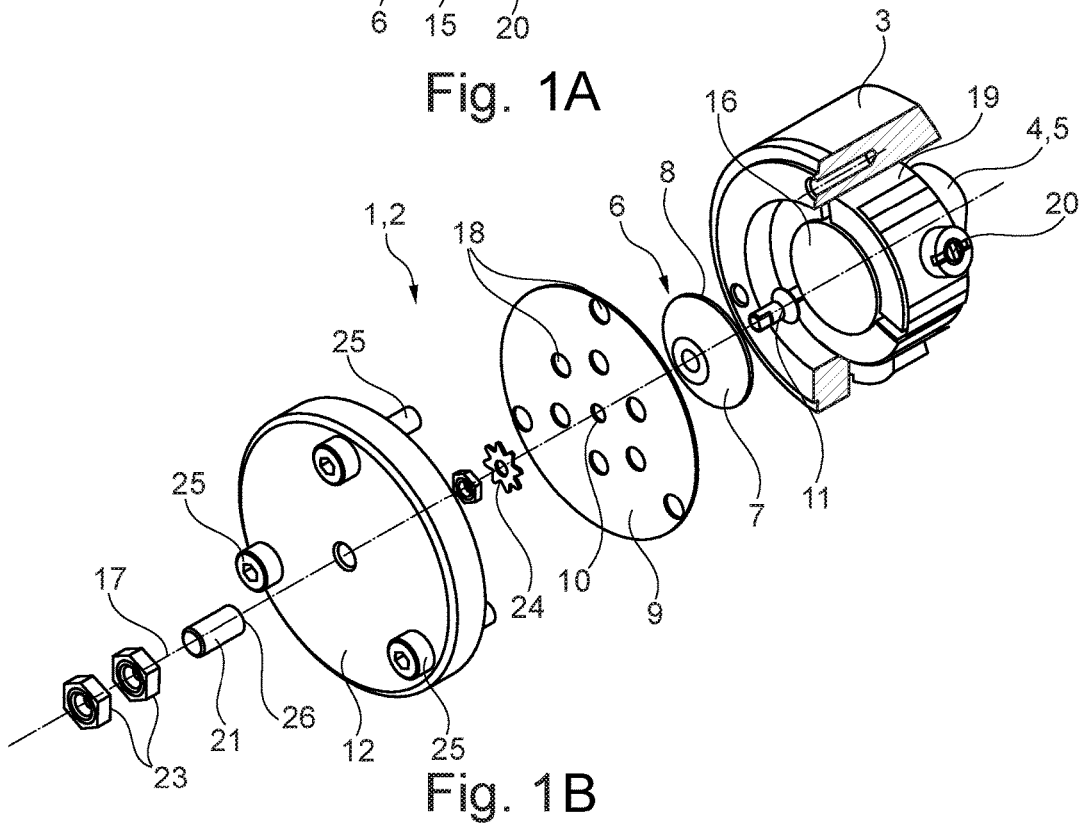
FIG. 1B illustrates an exploded representation of FIG. 1A.

According to FIGS. 1 to 9, a supercharging device 1 according to the invention, for example an exhaust gas turbocharger 2, comprises a rotor 4 mounted in a housing 3. Here, the rotor 4 is mounted on the longitudinal end side in an axial bearing 6 on the end side in the housing 3 via suitable bearing sections 5. The axial bearing 6 according to the invention comprises the following components: an axial bearing disc 7 with a first bearing surface 8, a membrane 9 with a central first opening 10, a screw connection 11, via which the axial bearing disc 7 is screwed to the membrane 9 through the central first opening 10, a bush 12 with a central second opening 13, wherein the bush 12 is connected, in particular screwed to the housing 3 and the membrane 9 is either directly clamped in between the bush 12 and the housing 3 (see FIG. 1) or indirectly via a cover disc 14 (see FIGS. 2 and 3) arranged between the bush 12 and the membrane 9. Here, the bush 12 can be designed as a threaded bush with an external thread while the housing 3 has an associated internal thread (see FIGS. 2 to 8) or is screwed to the housing 3 via screws 25 or connected to the same in another way (see FIGS. 1 and 9). In addition, the axial bearing 6 according to the invention comprises an adjusting screw 21, which is screwed into the central second opening 13 of the bush 12 and depending on position, delimits or makes possible an axial movement of the screw connection 11 in axial direction, i.e. along an axis of rotation 17. By way of the adjusting screw 21 it is also possible to tension the membrane 9 and/or adjust a rotor position and an axial gap between a compressor wheel 31 and a compressor housing 32 and/or an axial gap between a turbine wheel 33 and a turbine housing 34. The axial bearing disc 7 can for example comprise graphite or be formed thereof. The graphite in turn can have various fillings or cores, for example of antimony, copper or silver. The axial bearing disc 7 can also be produced from copper or a copper alloy and have a graphite coating.

Looking at FIGS. 1 to 9 further, it is evident that the axial bearing disc 7 has a truncated cone-like shape and with its first bearing surface 8 is arranged spaced via a gap 15 from a second bearing surface 16 (see in particular FIG. 3) of the rotor located opposite. With the moveably mounted axial bearing disc 7 according to the invention, i.e. in the stator of the axial bearing 6, it is possible to easily offset deviations with respect to an axis of rotation 17 between the rotor 4 and the axial bearing disc 7 and thereby comparatively easily compensate in particular production inaccuracies. With the at least slightly tiltable axial bearing disc 7, uneven temperature strain of the housing 3 can additionally be offset since the axial bearing disc 7 is no longer rigidly connected to the housing. In order to be able to further increase the flexibility of the adjusting possibility of the axial bearing disc 7, the membrane 9 can comprise at least one through-opening 18, which as cross-sectional weakening, reduces the stiffness of the membrane 9.

Looking at the supercharging device 1 according to FIGS. 1 to 9 further, it is evident that in the housing 3 a radial bearing element 19 is arranged, which brings about a radial mounting of a bearing section 5 and additionally of the rotor 4 and which is fixed on the housing via a radial screw 20 (see FIG. 1) that is accessible from the outside.

Here, the membrane 9 can be clamped in either over its entire circumference between the housing 3 and the bush 12 (see FIG. 1) or the cover disc 14 (see FIGS. 2 and 3) or only in suitable sections. Because of this, the stiffness of the membrane 9 can also be influenced in a comparatively easy manner. It is conceivable for example that the membrane 9 is clamped in between the bush and the housing 3 or between the cover disc 14 and the housing 3 only in at least three locations.

In the case of air mounting of rotors 4 it is generally important that both parts of the bearing device, here of the axial bearing 6, i.e. both rotor 4 and also the fixed axial bearing disc 7 (stator) are aligned parallel to one another to the maximum possible. Even a relatively minor tilting of both of these planes in this case results in a deterioration or even a complete loss of the load carrying capacity of the bearing or of the axial bearing 6. Through the axial bearing 6 according to the invention, which comprises a tiltable axial bearing 7 which is thus not arranged fixed on the housing 3, a resilient design can be achieved with which it is possible, in particular, to compensate form instabilities for example because of different heat strain. In order to fix the rotor 4 in axial direction, i.e. in the direction of the axis of rotation 17, the adjusting screw is provided.

The air cushion between the two bearing surfaces 8, 16 required for the air mounting of the rotor 4 in axial direction in this case can be favoured via suitable grooves 22 (see FIG. 3) or other flow guiding elements. Here, the grooves 22 can be arranged either on the first bearing surface 8 of the axial bearing disc 7 and/or on the second bearing surface 16 of the rotor 4.

For locking the adjusting screw 21 in axial direction, lock nuts 23 can obviously be additionally provided. In addition, the screw connection 11 can comprise a washer 24 which on the one hand is able to resiliently preload the axial bearing 7 against the membrane 9 by means of the screw connection 11. Here, the washer 24 is arranged on the side of the membrane 9 facing away from the rotor 4.

Preferentially, an adjusting device 28 for turning the adjusting screw 21 and thus for adjusting the axial bearing 6 is additionally provided. The adjusting device 28 can for example be an electric motor or an electric control which opens up the possibility of changing or regulating an axial gap between the compressor wheel and the compressor housing during operation. This would have a very good thermodynamic influence. Such an adjusting device 28 is shown only highly schematically in FIG. 1, wherein in this case obviously the lock nuts 23 would not be present.

Figure 2A:
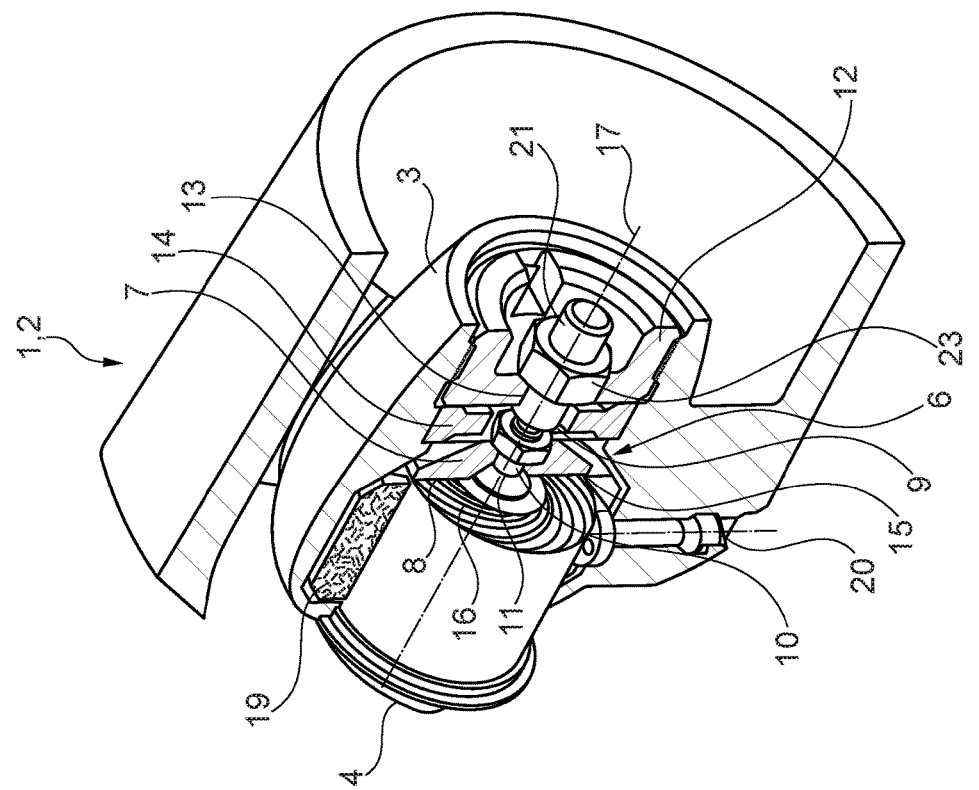
FIG. 2A illustrates a representation as in FIG. 1A, however with an alternative embodiment of the axial bearing.
Figure 2B:
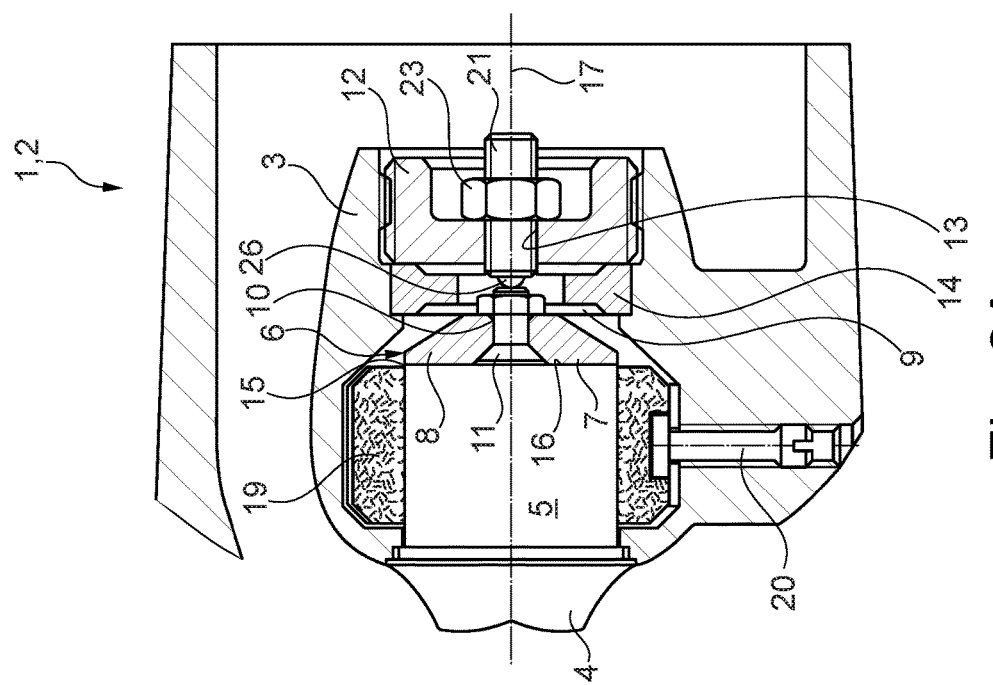
FIG. 2B illustrates an oblique view of the sectional representation according to FIG. 2A.
Figure 3B:
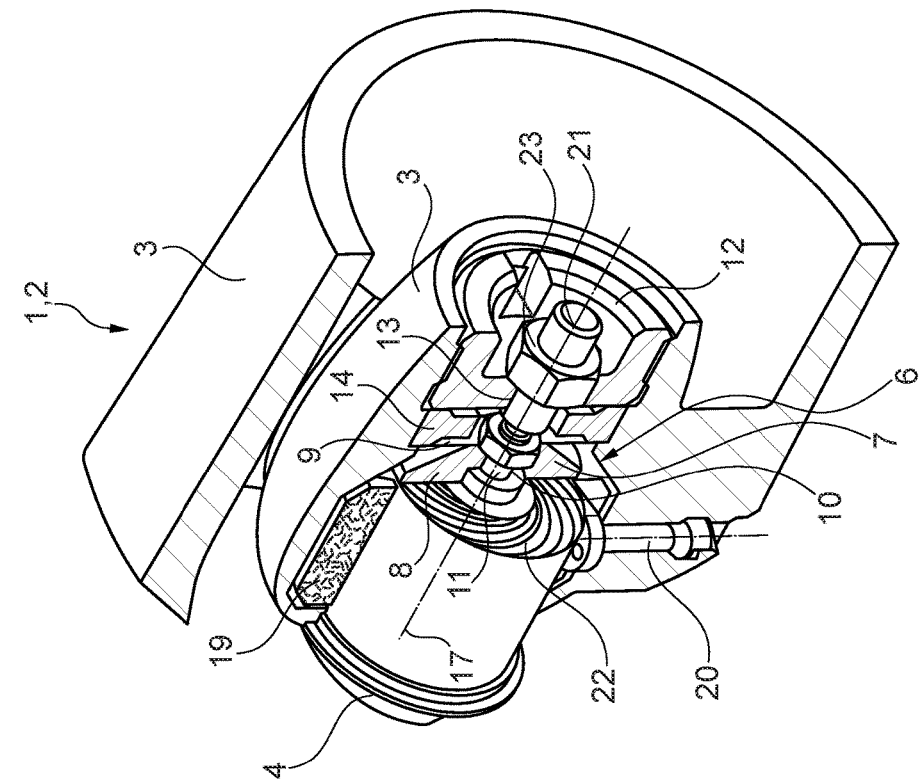
FIG. 3B illustrates an oblique view of the sectional representation according to FIG. 3A.
Figure 3A:
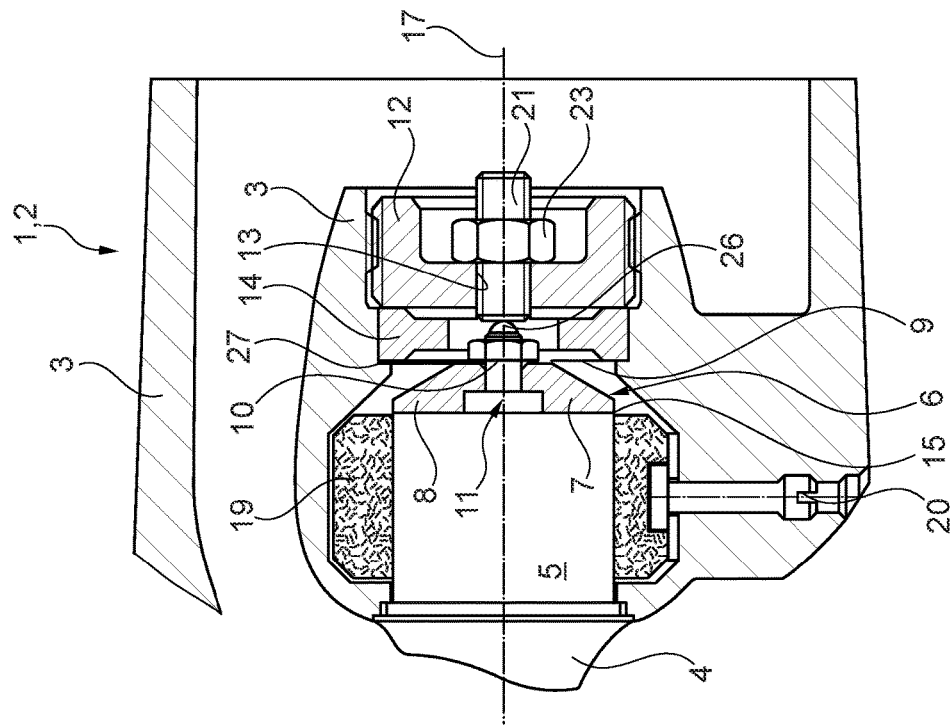
FIG. 3A illustrates a representation as in FIG. 2A, however with an alternative embodiment of the screw connection.

Looking at the FIGS. 2 and 3 in comparison it is evident that according to FIG. 2 a ball segment-like extension 26 is provided on the adjusting screw 21, while this ball segment-like extension 26 according to the embodiment of FIG. 3 is arranged on the screw of the screw connection 11. The last mentioned version is likely to be preferred, both alternative embodiments having in common that only a very small and low-friction contact surface to the screw of the screw connection 11 (see FIG. 2) or to the adjusting screw 21 (see FIG. 3) is created via the ball segment-like extension 26.

In FIG. 4, a detail A on an outer edge of the membrane 9 is shown, wherein it is evident that here the housing 3 has an annular recess 27, as a result of which the membrane 9 can make better contact.

Figure 6:
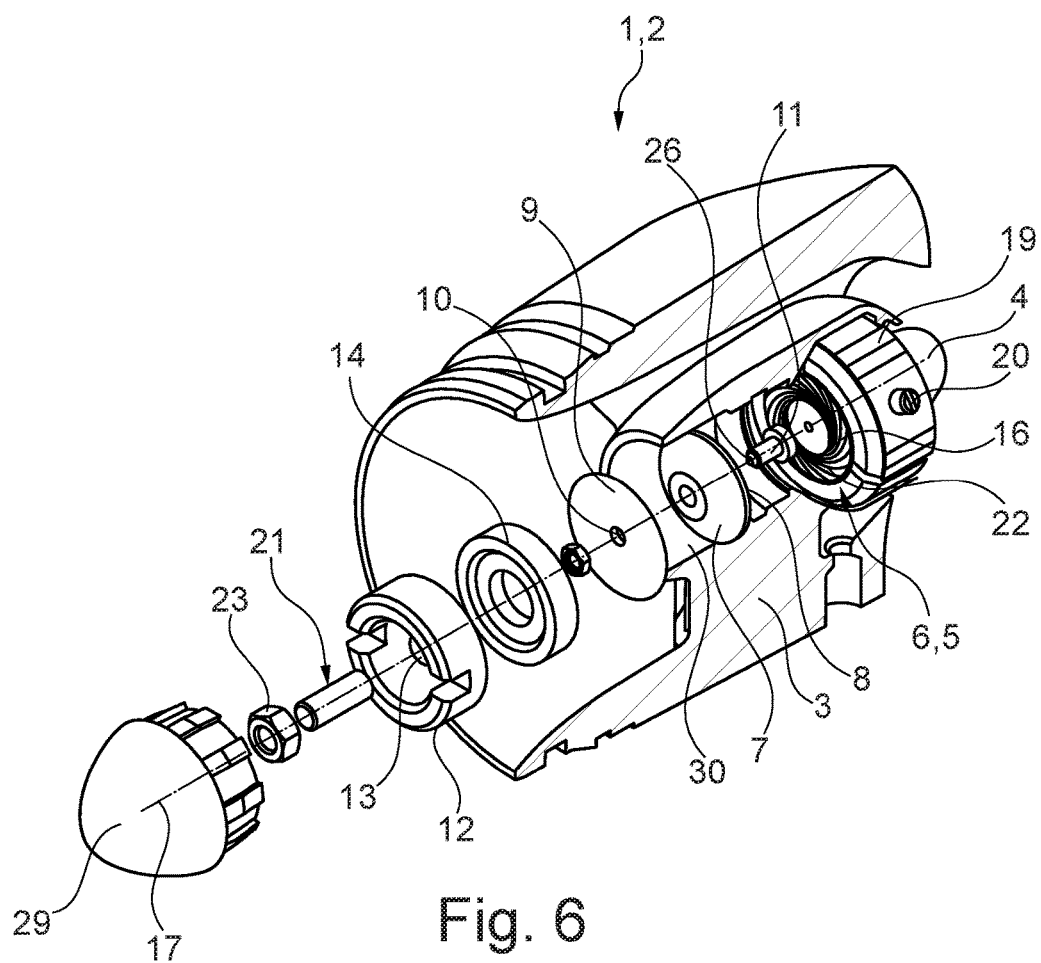
FIG. 6 illustrates an exploded representation of FIG. 5B.

In the FIGS. 5 and 6 an embodiment is shown, in which a cup 29 for the aerodynamically favourable covering of the axial bearing 6 is provided. This cup 29 is simply pressed into an associated opening 30 of the housing 3. The cup 29 can for example be formed as a cost-effective plastic injection moulding, provided it is arranged on the compressor side.

Figure 7:
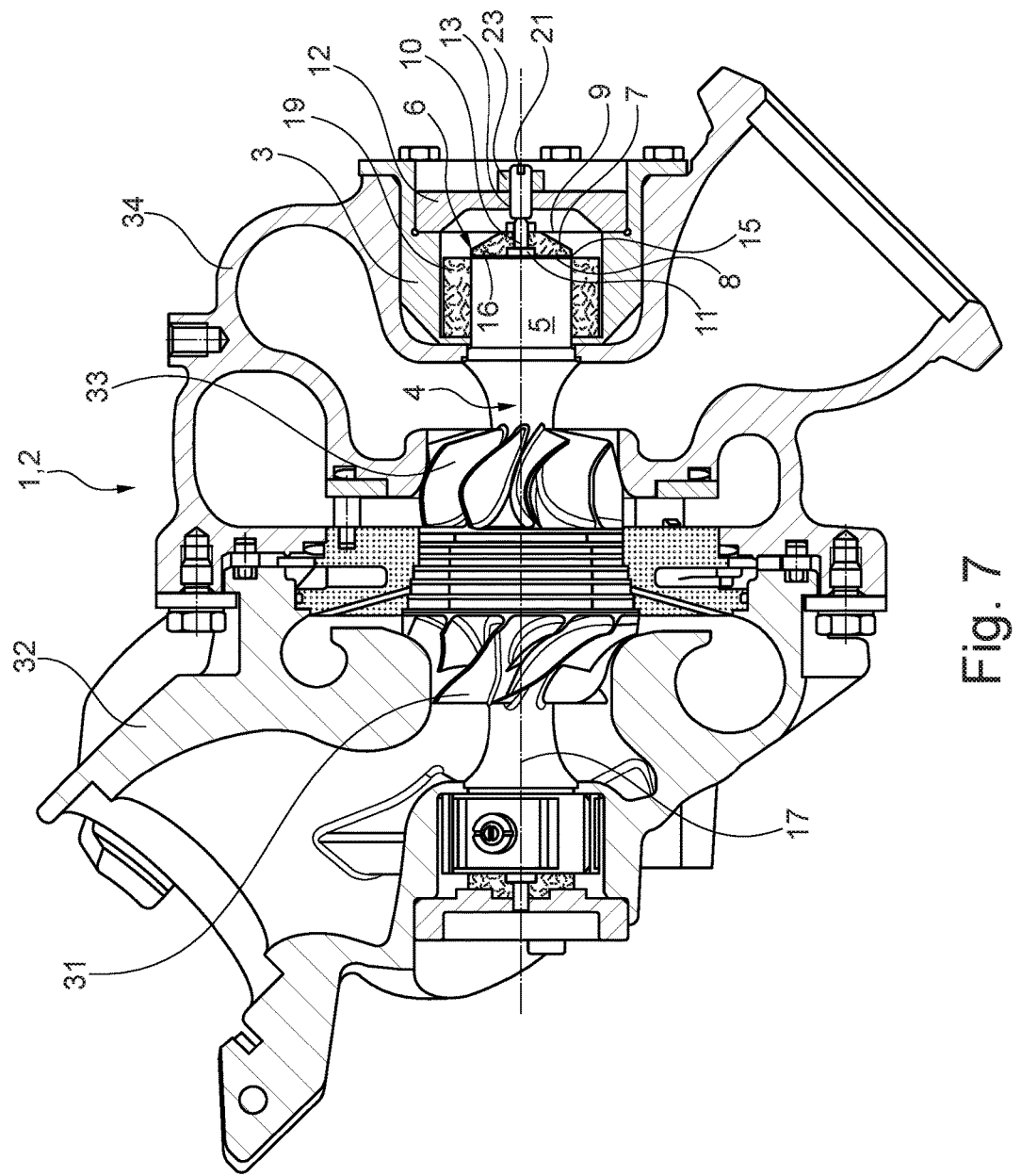
FIG. 7 illustrates a sectional representation through a supercharging device with an axial bearing according to the invention on only one side.
Figure 8:
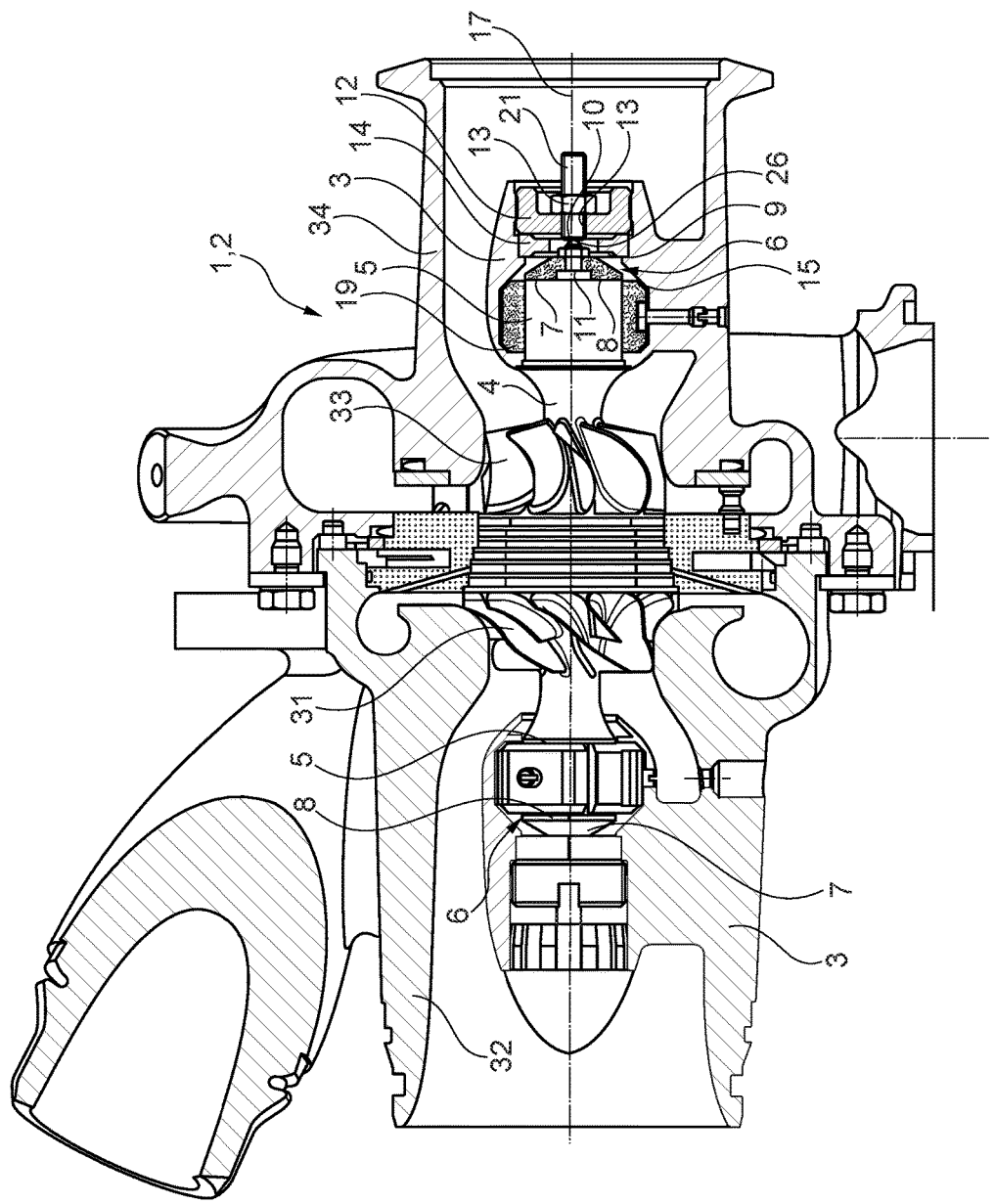
FIG. 8 illustrates a sectional representation through a supercharging device with axial bearings according to the invention arranged on both sides.
Figure 9:
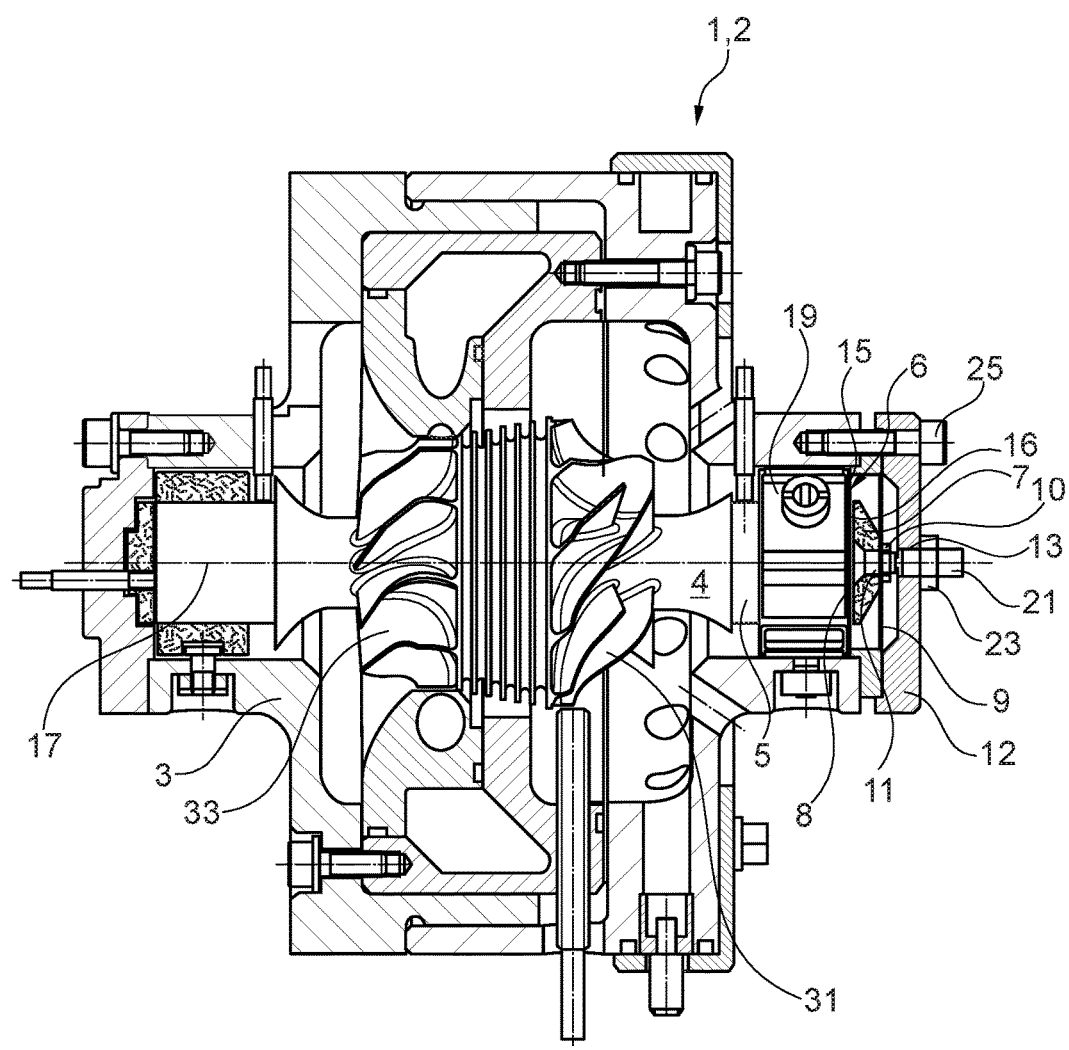
FIG. 9 illustrates a sectional representation through a supercharging device with an axial bearing according to the invention on the compressor side.

FIG. 7 shows a sectional representation through a supercharging device 1 with an axial bearing 6 according to the invention arranged on the turbine side. On the compressor side (left) by contrast an axial bearing which is fixed in axial direction is provided. Compared with this, FIG. 9 shows a sectional representation through a supercharging device 1 with an axial bearing 6 according to the invention arranged on the compressor side. On the turbine side (left) by contrast an axial bearing that is fixed in axial direction is provided. Alternatively it is obviously also conceivable that an axial bearing 6 according to the invention is arranged on both the compressor side and also on the turbine side, as is shown in FIG. 8.

Generally it is possible to connect the bush 12 on the housing 3 via separate fastening screws 25 (see FIG. 1), wherein in this case the fastening screws 25 penetrate the bush 12. Alternatively it is also conceivable that the bush 12 has an external thread via which it can be screwed into a corresponding internal thread on the housing 3, as is shown according to FIGS. 2 to 8.

With the axial bearing 6 according to the invention it is possible for the first time to simply offset temperature or production-related axial deviations between the rotor 4 and the axial bearing disc 7 since the latter is not arranged in a fixed manner on the housing 3 as in the past, but at least slightly moveably on the membrane 9.

The invention claimed is:

1. A supercharging device, comprising:
a rotor mounted in a housing;
the rotor mounted in the housing via an axial bearing disposed on an end side of the rotor;
the axial bearing including:
an axial bearing disc with a first bearing surface;
a membrane with a central first opening;
a screw connection that secures the axial bearing disc to the membrane through the central first opening;
a bush with a central second opening, wherein the bush is connected to the housing and the membrane is clamped in between the bush and the housing; and
an adjusting screw screwed into the central second opening of the bush, wherein the adjusting screw delimits and facilitates an axial movement of the screw connection and thus of the axial bearing disc.

2. The supercharging device according to claim 1, wherein the axial bearing disc has a truncated cone-like shape and the first bearing surface is arranged spaced via a gap from a second bearing surface of the rotor disposed opposite the first bearing surface.

3. The supercharging device according to claim 1, wherein the screw connection includes a washer.

4. The supercharging device according to claim 3, wherein the washer is arranged on a side of the membrane facing away from the rotor.

5. The supercharging device according to claim 1, wherein the membrane is clamped in entirely over a circumference directly or indirectly between the bush and the housing.

6. The supercharging device according to claim 1, wherein the supercharging device is an exhaust gas turbocharger.

7. The supercharging device according to claim 1, further comprising a cover disc arranged between the bush and the membrane.

8. The supercharging device according to claim 1, wherein the bush is a threaded bush including an external thread and the housing includes an associated internal thread.

9. The supercharging device according to claim 1, further comprising an adjusting device for turning the adjusting screw.

10. The supercharging device according to claim 1, wherein the axial bearing disc includes a graphite material, the graphite material including one or more fillings.

11. The supercharging device according to claim 10, wherein the one or more fillings of the graphite material include at least one of antimony, copper and silver.

12. The supercharging device according to claim 1, wherein the axial bearing disc includes a copper material and a graphite coating disposed on the copper material.

13. The supercharging device according to claim 12, wherein the copper material is a copper alloy.

14. The supercharging device according to claim 1, wherein the bush is screwed to the housing.

15. The supercharging device according to claim 1, wherein the axial bearing disc has a truncated cone shape and the first bearing surface is arranged spaced via a gap from a second bearing surface of the rotor disposed contacting the first bearing surface.

16. The supercharging device according to claim 1, wherein the rotor defines a rotation axis and the axial bearing is disposed on an axial end side of the rotor.

17. The supercharging device according to claim 1, wherein the membrane is clamped only in at least three locations between the bush and the housing.

18. The supercharging device according to claim 1, wherein the axial bearing disc is screwed via the screw connection to the membrane through the central first opening.

19. The supercharging device according to claim 1, further comprising a radial bearing element mounting the rotor in the housing in a radial direction of the rotor.

20. An exhaust gas turbocharger, comprising:
   a rotor defining a rotation axis;
   a housing;
   an axial bearing disposed on an axial end side of the rotor with respect to the rotation axis, the rotor mounted in the housing via the axial bearing, the axial bearing including:
      an axial bearing disc having a first bearing surface;
      a membrane having a central first opening;
      a screw connection that secures the axial bearing disc to the membrane through the central first opening;
      a bush having a central second opening, wherein the bush is connected to the housing and the membrane is clamped in between the bush and the housing; and
   an adjusting screw disposed in the central second opening of the bush, wherein the adjusting screw delimits and facilitates an axial movement of the screw connection and thus of the axial bearing disc.

* * * * *